United States Patent Office 3,646,172
Patented Feb. 29, 1972

3,646,172
1 - (O,O - DIORGANOPHOSPHORODITHIATO) ALKYL CARBOXYLATES AND PROCESS FOR MAKING SAME
Herbert Myers, Philadelphia, Pa., assignor to Mobil Oil Corporation
No Drawing. Original application Apr. 5, 1965, Ser. No. 445,697, now Patent No. 3,350,348, dated Oct. 31, 1967. Divided and this application Sept. 8, 1967, Ser. No. 666,464
Int. Cl. C07f 9/08; B01j 1/16
U.S. Cl. 260—928    22 Claims

ABSTRACT OF THE DISCLOSURE

1 - (O,O-diorganophosphorodithiato)alkyl carboxylates are prepared by reacting an O,O-diorganophosphorodithioic acid with a vinyl carboxylate. These products have utility in inhibiting oxidation and preventing metal corrosion when used in a variety of industral organic media.

CROSS-REFERENCE TO RELATED APPLICATION

This application is a division of copending application Ser. No. 445,697, filed on Apr. 5, 1965 now U.S. Patent No. 3,350,348.

BACKGROUND OF THE INVENTION

Field of the invention

This invention relates to a novel class of compounds and to the method of preparing same. More specifically, it relates to novel oil-soluble organic compounds and to a novel reaction to produce the same.

Description of the prior art

U.S. Patent No. 3,166,581 discloses as insecticides esters of O,O-diorganophosphorothioic acids. The esters are produced by various methods. However, the products obtained are not always effective in industrial organic media, such as lubricating oils. U.S. Patent No. 3,168,436 discloses insecticides produced chemically by reacting a salt of a phosphorothioic acid and a halogenated ester. Since the reactants are not always readily obtained in the desired form, they must first be converted to the salt and the halogenated derivatives before any reaction can occur. These are additional manufacturing steps.

SUMMARY OF THE INVENTION 1-(O,O-diorganophosphorodithioato)alkyl carboxylates are produced by the novel method of reacting an O,O-diorganophosphorodithioic acid with a vinyl-type carboxylate. The compounds produced in accordance with this invention have the structure:

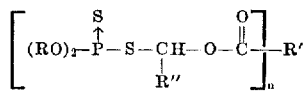

DESCRIPTION OF SPECIFIC EMBODIMENTS

In the above structure, the symbols may be as follows: wherein $n$ is an integer of 1 to 2; R is an alkyl, including both primary and secondary alkyl, or cycloalkyl or alkenyl radical containing from 1 to 18 carbon atoms, especially alkyl and alkenyl having at least 6 carbon atoms, or an aryl, alkylaryl or alkenylaryl radical having from 1 to 5 alkyl substituents attached to the aromatic nucleus, the alkyl substituents containing from 1 to 12 carbon atoms, and having a total of up to 18 carbon atoms, or a hydroxy or halogen derivative of the above-defined alkyl (especially hydroxyalkyl containing at least 6 carbon atoms) or aryl radical; R' is hydrogen or an alkyl or cycloalkyl or alkenyl radical or (when $n$ is 2) an alkenylene or arylene radical having from 1 to 11 carbon atoms; or an aryl radical, such as phenyl or naphthyl, or aralkyl or alkaryl or an alkenylaryl radical, the aromatic nucleus being substituted with up to 5 alkyl groups each having from 1 to 12 carbon atoms, with a total number of up to 18 carbon atoms, or the halo derivatives thereof; and R" is alkyl, haloalkyl and aralkyl having similar substituent groups as R' above. When $n$ is 1 and R' may be the bracketed group itself; or when $n$ is 2 and R' is alkenylene or arylene, the carboxylates are dibasic as indicated by the formula

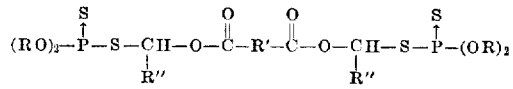

Suitable dicarboxylates include oxalates, succinates, maleates, fumarates, phthalates, or cyclohexane dicarboxylates.

In the typical procedure for preparing the compositions of this invention, a phosphorodithioic acid reactant is mixed, gradually and with agitation, with a vinyl carboxylate reactant, reactive at the alpha carbon, at a temperature in the range of bout 40° to about 150° C.

The reaction sequence is as follows (in the case of $n$ being 1):

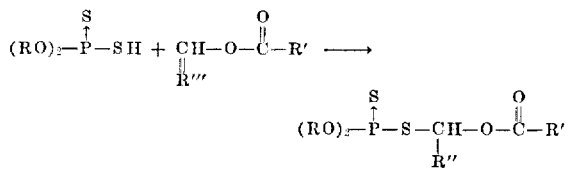

wherein R, R' and R" have the aforementioned definitions and R''' is an alkylidene or aralkylidene group which is converted to R" in the reaction.

The ratio of the vinyl carboxylate to the phosphorodithioic reactant is at least stoichiometric and usually in the range of about 0.75 to 4.0, and preferably 1.0 to 1.5, moles of carboxylic ester per mole of phosphorodithioic acid compound. When both of the reactants have been combined, the temperature is held at the temperature of the reaction until the reaction is deemed complete. Generally, the total reaction time takes about 30 minutes to five hours, preferably 1 to 2 hours.

The reaction is preferably carried out in a liquid phase. If sufficient phosphorodithioic acid reactant is used no additional solvent is necessary. If desired, an organic solvent which is not reactive to the reaction mixture may be added. Such solvents include benzene, n-heptane, cyclohexane, or any of the known solvent-refined processing oils.

At the end of the reaction, excess carboxylate is removed by vacuum distillation. If an organic solvent has been added, this too is removed by distillation. Other reaction products, reactants or solvents may be removed by washing. The residual product is in the form of an oil-soluble liquid. If a process oil is used as the reaction solvent, the oil may be allowed to remain in the product for subsequent addition to the final lubricating composition.

As discussed earlier, the temperature for the reaction is maintained at a moderate level, in the range of about 40° C. to about 150° C., and preferably from about 45° C. to 90° C. Once the product has been formed in the reaction mixture the temperature can be increased without danger of thermal decomposition of the product.

Suitable esters for use as the carboxylic reactants in this invention include the vinyl and substituted vinyl esters of carboxylates described hereinabove and specifically vinyl acetate, vinyl propionate, vinyl butyrate, butenyl propionate and other aliphatic acid esters containing up to 12 carbon atoms, including branched aliphatic acid esters, such as vinyl isobutyrate. Aromatic esters include vinyl benzoate and vinyl naphthoate. Other esters which may also be used include dicarboxylic acid esters, such as divinyl oxalate, divinyl succinate, and divinyl cyclohexane dicarboxylate; aryl dicarboxylic acid esters, such as divinyl phthalate and divinyl terephthalate, and the unsaturated carboxylic esters, such as divinyl maleate and divinyl fumarate.

The phosphorodithioic acid reactants are normally prepared by the reaction of 4 moles of an alcohol or phenol with one mole of phosphorus pentasulfide as follows:

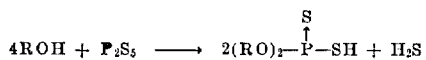

Suitable alcohols include methyl alcohol, ethyl alcohol, propyl alcohol, isopropyl alcohol, butyl alcohol, isobutyl alcohol, amyl alcohol, isoamyl alcohol, hexyl alcohol, oleyl alcohol, isohexyl alcohol, isodecyl alcohol, trimethylpentyl alcohol, crotyl alcohol, benzy alcohol, tetrahydro-furfuryl alcohol, dimethylbutyl alcohol, and cyclic alcohols, such as cyclohexanol. Suitable aromatic alcohols include phenol and alkylphenols which have up to 5 alkyl groups on the ring, including cresol and nonylphenol. Halogenated alcohols may also be used, such as chlorophenol and ethylene or propylene chlorohydrin. The resulting product is hereafter referred to as O,O-dialkyl- or O,O'-diarylphosphorodithioic acid. Mixed esters may also be utilized, and hence any combination of the above alkyl and aryl compounds are satisfactory in employing the present invention.

The alkenyl or vinyl-type, carboxylic phosphorodithioic acid ester products of this invention have excellent solubility in the typical lubricating oils in which they are intended to be used. Generally their solubility exceeds the amount required to obtain the desired antioxidant and anticorrosion characteristics furnished by these adducts.

The following examples and test results illustrate the typical manner of carrying out and utilizing the invention thereby. Any mention of parts and percentage in these examples unless otherwise specified will be deemed to be on a weight basis.

EXAMPLE 1

Preparation of O,O-diisobutylphosphorodithioic acid

Into a four-necked flask equipped with a stirrer, condenser, dropping funnel and thermometer are added 296 grams (4.0 moles) of isobutyl alcohol and the contents are heated to 75° C. At that temperature 222 grams (1.0 mole) of phosphorus pentasulfide are added portionwise over an hour period with agitation. After all of the sulfide reactant is introduced, the temperature is raised to 90° C. and held for three hours. The evolution of hydrogen sulfide gas indicates a substantially complete reaction. The reaction product is cooled and filtered.

EXAMPLE 2

Preparation of 1-(O,O-diisobutylphosphorodithiato) ethyl acetate

Into a flask equipped with a stirrer, condenser, dropping funnel and thermometer are added 484.6 grams (2 moles) of the O,O-diisobutylphosphorodithioic acid prepared in Example 1 and thereafter with stirring 258.3 grams (3.0 moles) of vinyl acetate are added dropwise to the acid over a half-hour period. The temperature during this addition is maintained at 78° C. At the end of the addition period, the reaction mixture is heated for one hour at a temperature ranging from 85° C. to 90° C. The reaction mixture is then passed into a rotary film evaporator heated by a boiling water bath and the unreacted vinyl acetate removed under reduced pressure. The yield of product is 650.9 grams of an amber-colored oil indicating a yield of about 99%.

*Analysis.*—Calc'd. for $C_{12}H_{25}O_4PS_2$ (percent): P, 9.44; S, 19.5. Found (percent): P, 9.45; S, 18.5.

EXAMPLE 3

Preparation of 1-(O,O-dioleylphosphorodithiato)ethyl acetate

O,O-dioleylphosphorodithioic acid prepared through the reaction of 400 grams (1.6 moles) of oleyl alcohol and 100 grams (0.45 mole) of phosphorus pentasulfide is charged into a reaction flask equipped with a stirrer and thermometer and heated to 45° C. Vinyl acetate (103 grams, 1.2 moles) is then added over a half-hour period with agitation. During this addition, the temperature rises to 85° C. The reaction product is then maintained at 85–90° C. with stirring for an additional hour and topped to a vapor temperature of 100° C. at 0.2 mm. to give 453 grams of a dark, amber-colored adduct.

*Analysis.*—Calc'd for $C_{40}H_{79}O_4PS_2$ (percent): P, 4.3; S, 8.9. Found (percent): P, 4.9; S, 8.6.

EXAMPLE 4

Preparation of 1-(O,O-di-2,2,4-trimethylpentyl-phosphorodithiato)ethyl acetate

The phosphorodithioic acid obtained in the example is prepared by a reaction between 122 grams (0.55 mole) of phosphorus pentasulfide and 260 grams (2.0 moles) of 2,2,4-trimethylpentan-1-ol, according to the procedure of Example 1. To this acid are added 69 grams (0.8 mole) of vinyl acetate over a 10-minute period at a temperature of 60° C. When the addition is complete, the temperature of the reaction mixture is raised to the reflux temperature, in the range of about 90° to 95° C. Refluxing is continued for four and one-quarter hours. The reaction product is washed with a 10% aqueous sodium hydroxide solution to remove excess acid and dried over sodium sulfate. The treated product is distilled under a nitrogen atmosphere at 3.5 mm. Hg pressure to a pot temperature of 120° C. The liquid product obtained from this procedure is slightly hazy. Further treatment by sodium sulfate followed by filtration through "Hi-Flo" (diatomaceous earth filter aid) produces a clear yellow liquid substance. The reaction yields 337 grams (96%) of product.

*Analysis.*—Calc'd for $C_{20}H_{41}O_4PS_2$ (percent): P, 7.0; S, 14.5. Found (percent): P, 6.9; S, 14.2.

EXAMPLE 5

Preparation of 1-(O,O-diphenylphosphorodithiato)ethyl acetate

The acid in this example is obtained by reacting phenol with phosphorus pentasulfide using the procedure of Example 1. Into a reaction flask equipped with a stirrer and thermometer is added a solution of 43 grams (0.50 mole) of vinyl acetate in 250 ml. of benzene. This solution is heated as a second solution, consisting of 70.6 grams (0.25 mole) of O,O-diphenylphosphorodithioic acid in 200 ml. of benzene, is added over a half-hour period with agitation. The temperature is raised to 70° C. and the mixture is agitated for an additional 18 minutes. At the end of this time, the benzene and unreacted vinyl acetate are removed under reduced pressure. The remaining 86.5 grams of crude product is cooled whereupon 21.0 grams of a white solid separates out of said product, leaving 65.5 grams of the liquid adduct. The adduct is separated from the precipitate by filtration.

*Analysis.*—Calc'd for $C_{16}H_{17}O_4PS_2$ (percent): P, 8.41; S, 17.4. Found (percent): P, 9.14; S, 16.9.

EXAMPLE 6

Preparation of 1-[O,O-di(nonylphenyl)phosphorodithiato]ethyl acetate

The acid is prepared in this example by using nonylphenol in the reaction with phosphorus pentasulfide. A solution containing 116 grams (0.20 mole) of O,O-di(nonylphenyl)phosphorodithioic acid in 150 ml. of benzene is added to a reaction flask equipped with a stirrer and thermometer. To this solution are added 34.4 grams (0.40 mole) of vinyl acetate over an 18-minute period with agitation. The temperature during this addition is maintained at about 40° C. and the agitation is continued at this temperature for an additional hour. Upon removal of the benzene and unreacted vinyl acetate, 131 grams (96% yield) of a clear yellow liquid adduct remains.

*Analysis.*—Calc'd for $C_{34}H_{53}O_4PS_2$ (percent): P, 5.0; S, 10.3. Found (percent); P, 4.7; S, 10.4.

EXAMPLE 7

Preparation of 1-(O,O-dimethylphosphorodithiato)ethyl acetate

Using similar procedures as in the previous example to produce the acid, 215 grams (2.5 moles) of vinyl acetate are added to 2.0 moles of O,O-dimethylphosphorodithioic acid prepared from the reaction between methanol and phosphorus pentasulfide, as described in Example 1. The reaction mixture requires frequent ice bath applications to keep the temperature at about 40° C. to 45° C. After the vinyl acetate addition the reaction mixture is heated at 50° C. for an additional hour. The product obtained from this reaction is 400.7 grams (82% yield) of a straw-colored clear liquid product.

*Analysis.*—Calc'd for $C_6H_{13}O_4PS_2$ (percent): P, 12.7; S, 26.2. Found (percent): P, 12.5; S, 23.2.

EXAMPLE 8

Preparation of 1-(O,O-diisopentylphosphorodithiato)ethyl acetate

The acid is obtained by a reaction between isopentyl alcohol and phosphorous pentasulfide using the procedure of Example 1. Into a reaction flask equipped with a stirrer and thermometer are added 100 grams (0.37 mole) of O,O-diisopentylphosphorodithioic acid. To the contents of the flask are added 50 grams (0.58 mole) of vinyl acetate over a half-hour period with agitation. During this addition the temperature is raised to 90° C., afterward the reaction mixture is maintained at 90° C. with agitation for an additional hour. Unreacted vinyl acetate is removed under reduced pressure in a rotary film evaporator heated by a boiling water bath. The adduct consists of 125 grams (95% yield) of an amber-colored oil.

*Analysis.*—Calc'd for $C_{14}H_{29}O_4PS_2$ (percent): P, 8.7; S, 18.0. Found (percent): P, 9.0; S, 17.0.

EXAMPLE 9

Preparation of 1-(O,O-diisobutylphosphorodithiato)ethyl benzoate

Using similar procedures as in the previous examples, 50 grams (0.336 mole) of vinyl benzoate are added to 81.5 grams (0.336 mole) of O,O-diisobutylphosphorodithioic acid in benzene. The addition takes half an hour during which time the temperature is held at about 85° C. The reaction mixture is held for an additional hour at 85° C. A 100% yield of pale yellow liquid adduct is obtained.

*Analysis.*—Calc'd for $C_{17}H_{27}O_4PS_2$ (percent): P, 7.91; S, 16.4. Found (percent): P, 7.86; S, 15.3.

EXAMPLE 10

Preparation of 1-(O,O-di(1,3-dimethylbutyl)phosphorodithiato)ethyl acetate

The acid in this example is obtained by a reaction between 4 moles of 1,3-dimethylbutan-1-ol with 1.1 moles of phosphorus pentasulfide as described in Example 1. To the crude product of this reaction are added 170 grams (2 moles) of vinyl acetate over a 15 minute period. During the addition the temperature is in the range of 60° C. to 70° C. Benzene (150 ml. is added. The reaction mixture is agitated and heated at a temperature of from 90° C. to 95° C. for a total of 6 hours. The reaction product is washed with 10% aqueous sodium hydroxide solution, dried over sodium sulfate and distilled under nitrogen at 3.5 mm. Hg pressure to a pot temperature of 120° C. The remaining liquid has the following analysis:

*Analysis.*—Calc'd for $C_{16}H_{33}O_4PS_2$ (percent); P, 8.1; S, 16.7. Found (percent): P, 8.3; S, 16.5.

EXAMPLE 11

Preparation of 1-(O,O-di-isobutylphosphorodithiato)ethyl butyrate

The acid used for this example is the same as that prepared in Example 1. Using similar procedures as in the previous examples, 100 grams (0.88 mole) of vinyl butyrate is added to 170 grams (0.70 mole) O,O-diisobutylphosphorodithioic acid with agitation. The addition takes half an hour in which time the temperature is increased from 45° C. to 85° C. The reaction mixture is held for an additional hour at 85° C. The unreacted vinyl butyrate is removed leaving a liquid product having the following analysis:

*Analysis.*—Calc'd for $C_{14}H_{29}O_4PS_2$ (percent): P, 8.7; S, 18.0. Found (percent): P, 9.2; S, 18.5.

EXAMPLE 12

Preparation of 1-[O,O-di(butylphenyl)phosphorodithiato]ethyl propionate

O,O-di(butylphenyl)phosphorodithioic acid is prepared using similar procedures as in the previous examples. To 77 grams (0.2 mole) of this acid are added 40 grams (0.4 mole) of vinyl propionate over a half hour period with agitation. The temperature during this addition is maintained at about 55° C. After the addition, the reaction mixture is stirred at about 55° C. for an additional hour. Unreacted vinyl propionate is removed under reduced pressure. The remaining product consists of 98 grams of an amber-colored liquid.

*Analysis.*—Cal'd for $C_{25}H_{35}O_4PS_2$ (percent): P, 6.27; S, 12.9. Found (percent): P, 6.04; S, 11.5.

EXAMPLE 13

Preparation of 1-(O,O-di-mixed organo-phosphorodithiato)ethyl acetate

Using the procedure as in Example 1, a mixture of nonyl-phenol and cresol isomers (meta and para), in a 1:1 mole ratio, are reacted with phosphorous pentasulfide using 6.48 moles of the mixed phenols and 1.62 moles of sulfide. To the crude product of this reaction are added 425 grams (4.94 moles) of vinyl acetate over a 1 hour period, with the temperature in the range of about 45° to 80° C. The mixture is agitated and the temperature is maintained at 80° C. for about 1.25 hours. Excess vinyl acetate is stripped as in the above examples leaving 1660 grams of a straw-colored product.

EXAMPLE 14

Preparation of di[1-(O,O-diisobutylphosphorodithiato)] ethyl succinate

To the di-1-chloroethyl succinate prepared by the reaction of 26.7 grams (0.173 mole) of succinyl chloride with 20 grams (0.46 mole) of acetaldehyde in 100 ml. of benzene containing 0.2 gram of dry zinc chloride there is added dropwise over a 15 minute period a solution of 97 grams (0.35 mole) of potassium O,O-diisobutylphosphorodithioate in 150 ml. of N,N-dimethylformamide while stirring. The temperature is maintained at 50° C. during the addition and is then raised to 80° and stirring is continued at this temperature for one additional hour.

After washing and distilling to remove solvent, there is obtained di-1-(O,O-diisobutylphosphorodithiato)ethyl succinate for which the infrared spectrum is very similar to that of 1-(O,O-diisobutylphosphorodithiato)ethyl acetate.

EXAMPLE 15

Preparation of 1-(O,O-diisodecylphosphorodithiato)ethyl acetate

The acid is obtained by a reaction between isodecyl alcohol and phosphorus pentasulfide using the procedure of Example 1. Into a reaction flask equipped with a stirrer and thermometer are added 790 grams (1.9 moles) of O,O-diisodecylphosphorodithioic acid. To the contents of the flask are added 250 grams (3.0 moles) of vinyl acetate. The reaction mixture is held for 2 hours at a temperature of 80° to 90° C. Unreacted vinyl acetate is thereafter removed. The yield of the liquid adduct is 100%; it has the following analysis:

*Analysis.*—Calc'd for $C_{24}H_{47}O_4PS_2$ (percent): P, 6.25; S, 12.9. Found (percent): P, 6.03; S, 12.6.

EXAMPLE 16

Preparation of 1-(O,O-di-2,2,4-trimethyl-3-hydroxy-pentylphosphorodithiato)ethyl acetate Using procedures similar to those of the above examples, 675 grams (1.75 mole) of O,O-di-2,2,4-trimethyl-3-hydroxy-pentyl-phosphorodithioate are reacted with 226 grams (2.62 mole) of vinyl acetate in a benzene solution. The temperature is maintained in the range of 85° to 88° C. for 1 hour. Thereafter the excess vinyl acetate and the benzene are removed by vacuum distillation. The analysis of the remaining liquid product obtained is:

*Analysis.*—Calc'd for (percent): P, 6.56; S, 13.6. Found (percent): P, 7.03; S, 14.2.

EVALUATION OF THE PRODUCTS

The products of the above examples were evaluated by typical engineering tests, namely the oxidation stability test and the bearing corrosion test.

(a) The oxidation stability test.—In this test the product is added to a solvent-refined, mineral lubricating oil. This oil composition is heated to 325° F. and dry air at the rate of 10 liters per hour is passed through it in the presence of iron, copper, aluminum and lead. After 40 hours the neutralization number for each composition is obtained using the ASTM D 974–1 method or procedure. The additives are rated in terms of the minimum weight percent of phosphorus required to limit the rise in the neutralization number to 2.0. The additives which are effective at approximately 0.125% or less by weight of phosphorus are deemed to be satisfactory additives.

(b) Bearing corrosion test.—The minimum amount of the additive to be tested is added to a solvent-refined mineral base oil in the presence or absence of a detergent and the oil composition is used to lubricate a copper-lead bearing in a CRC L–38 test engine run for 40 hours. At the end of the run the test bearing is removed and weighed. If there is a loss of weight of the bearing of over 50 mg., the lubricating oil is deemed to have failed.

The data obtained in testing the composition of this invention using the above test methods are compiled in the table below.

| Example No.: | Percent phosphorous, in oxidation stability test | Bearing weight loss, mg. |
|---|---|---|
| 2 | 0.087 | 4 |
| 3 | 0.098 | 8 |
| 4 | <0.036 | 50 |
| 5 | 0.035 | |
| 6 | 0.021 | ¹ 43 |
| 7 | 0.112 | 22 |
| 8 | 0.039 | ¹ 39 |
| 9 | 0.024 | 43 |
| 11 | 0.086 | 46 |
| 12 | 0.030 | 50 |
| 13 | 0.036 | |
| 14 | 0.09 | |
| 15 | 0.059 | ¹ 25 |
| 16 | 0.044 | ¹ 33 |
| No additive | | 3,669 |

¹ Detergent present.

The above results show that the compositions of this invention prevent the oxidation of lubricating oils, even in the presence of metal catalysts. In the bearing corrosion test, it will be noted by comparison that the same lubricating oil containing no additives at all permits an extremely high weight loss.

Extreme pressure properties

The extreme pressure properties of two products prepared in the above examples were tested using SAE 90 solvent-refined mineral base oil. The oil was blended with (1) 6.2% of the product of Example 4 and (2) 5.2% of the product of Example 10. The two oil blends were tested on an SAE load machine. In this test, two cylinders, driven at different speeds, are rotated against one another, and these roll and slide in line contact under controlled loads. The faster cylinder was operated at 500 r.p.m. The load is increased until failure, i.e. scuffing or seizure occurs; the loading rate is about 78 lbs. per second. At this point the total load is reported. Each sample oil was tested twice.

| Oil composition: | Seizure load, lbs. |
|---|---|
| (1) Composition 4 | 270,275 |
| (2) Composition 10 | 270,290 |

L–1 Caterpillar engine test

The products of Examples 2 and 6 were tested in a lubricating oil in the L–1 Caterpillar engine test using a nonmetallic detergent.

The Caterpillar engine test determines the ability of the oil to prevent deposits around important parts of the engine including the piston and crankcase areas. A 1-cylinder, 4-cycle Caterpillar engine is run under the following operating conditions:

| | |
|---|---|
| Oil temperature ° F. | 150 |
| Jacket temperature ° F. | 180 |
| Speed r.p.m. | 1000 |
| Brake load, HP | 19.8 |

The duration of the test was 480 hours. The diesel fuel of the engine contained 1% sulfur. A typical refined lubricating oil each containing 1% by weight of the products of Examples 2 and 6 and 3% of a commercial detergent. The engine was examined for deposits at various times during the run. The test results are reported below:

PRODUCT OF EXAMPLE 2

| Duration of run, hours | 120 | 240 | 480 |
|---|---|---|---|
| Engine rating | 99.5 | 99.2 | 96.4 |
| Lacquer demerits | 0 | 0.2 | 2.2 |
| Top groove packing, percent | 3 | 3 | 5 |

PRODUCT OF EXAMPLE 6

| Duration of run, hours | 132 | 254 | 480 |
|---|---|---|---|
| Engine rating | 99.9 | 99.6 | 98.5 |
| Lacquer demerits | | | 0.6 |
| Top groove packing, percent | 1 | 2 | 3 |

The engine rating expresses the over-all conditions of the engine at the end of the test run; a scale of 0 to 100 is used, a 100 rating indicating a perfectly clean engine. The lacquer demerits indicate the amount of deposits coating the rings, the grooves and lands and the skirts of the piston; demerits are given for quantity of coating and degree of lacquering as evidenced by color standards, and the sticking tendencies of the piston ring; the scale is from 0 to 100, a rating of 0 indicating completely clean surfaces and no demerits of any kind. The top groove packing rating indicates in percent of volume the amount of the carbon deposited in the top groove of the piston; the scale is from 0 to 100%, a rating of 0 indicating a completely clean groove.

Thermal gravimetric test

This test investigates the stability of the novel compounds of this invention at high temperatures by subjecting the compounds to increasing heat while the rate of weight loss is observed. The temperature at which weight loss rate is markedly increased is designated as the inflection temperature; hence, a high inflection temperature indicates satisfactory stability. The products which were tested have been prepared according to the procedures used in the above examples, including products not specifically described heretofore.

| $(RO)_2P(S)SCHOC(O)R'$ $R''$ | Inflection temperature, °C. | Percent weight loss at 200° C. |
|---|---|---|
| R=isobutyl; R'=methyl; R''=methyl | 175 | 12.1 |
| R=p-methylphenyl; R'=methyl; R''=methyl | 185 | 9.3 |
| R=m-methylphenyl; R'=methyl; R''=methyl | 185 | 3.9 |
| R=mixed m-, and p-methylphenyl and nonylphenyl (1:1 by weight) R'=methyl; R''=methyl | 235 | 0 |
| R=nonylphenyl; R'=methyl; R''=methyl | 235 | 0 |
| R=phenyl; R'=methyl; R''=methyl | 180 | 7.2 |
| R=isobutyl; R'=methyl; R''=propyl | 225 | 0 |
| R=isobutyl; R'=n-propyl; R''=methyl | 210 | 0 |
| R=isobutyl; R'=phenyl; R''=methyl | 210 | 1.2 |

The above test results indicate that the products of this invention are not only highly useful high-temperature antioxidant and corrosion inhibitors, but they also possess extreme pressure characteristics for use in the lubrication of present-day engines. It has been found that the presence of from about 0.05% to about 15% by weight of these additives in oil formulation provides satisfactory performance of lubricating composition and aids in extending the life of the oil. Furthermore, these additives are compatible with other typical oil additives, such as pour point depressors, viscosity index improvers, antirust agents, as well as other detergents. Moreover, they are found to have unexpectedly higher solubility in lubricating oils than other dithiophosphoric compounds.

I claim:

1. As a composition of matter, a phosphorodithioic alkyl carboxylate having the formula

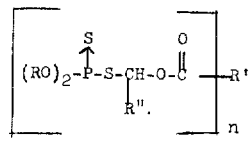

wherein R is selected from the group consisting of alkyl, and cycloalkyl radicals having from at least 6 carbon atoms to 18 carbon atoms, chloroalkyl, alkenyl and hydroxyalkyl radicals having from 1 to 18 carbon atoms, and aryl, hydroxyaryl, chloroaryl and alkaryl radicals having up to 5 alkyl substituents on the aromatic nucleus, the alkyl substituents each having from 1 to 12 carbon atoms and a total of up to 18 carbon atoms; $n$ is an integer of 1 to 2; R' is selected from the group consisting of alkyl, cycloalkyl, aralkyl, alkenyl, aryl, and alkaryl having up to 18 carbon atoms, when $n$ is 1; and alkylene, alkenylene and arylene having up to 18 carbon atoms, when $n$ is 2; and R'' is selected from the group consisting of alkyl having from 1 to 18 carbon atoms and aralkyl having from 1 to about 18 carbon atoms in the alkyl group.

2. The composition of matter of claim 1 wherein $n$ is 1.
3. The composition of matter of claim 2 wherein R' is alkyl having 1 to 12 carbon atoms.
4. The composition of matter of claim 3 wherein R' is methyl.
5. As the composition of matter of claim 2, a 1-(O,O-di-hexylphosphorodithiato)ethyl acetate.
6. As the composition of matter of claim 2, a 1-(O,O-di-octylphosphorodithiato)ethyl acetate.
7. As the composition of matter of claim 2, a 1-(O,O-di-decylphosphorodithiato)ethyl acetate.
8. As the composition of matter of claim 2, a 1-(O,O-di-oleylphosphorodithiato)ethyl acetate.
9. The composition of matter of claim 2, wherein R is aromatic.
10. As the composition of matter of claim 9, 1-(O,O-di-phenylphosphorodithiato)ethyl acetate.
11. As the composition of matter of claim 9, 1-(O,O-di-cresylphosphorodithiato)ethyl acetate.
12. As the composition of matter of claim 9, 1-(O,O-di-butylphenylphosphorodithiato)ethyl propionate.
13. As the composition of matter of claim 9, 1-(O,O-di-nonylphenylphosphorodithiato)ethyl acetate.
14. As the composition of matter of claim 9, a 1-[O,O-di-(mixed cresyl and nonylphenyl)phosphorodithiato]-ethyl acetate.
15. As the composition of matter of claim 9, 1-(O,O-di-2,2,4 - trimethylpentylphosphorodithiato)ethyl acetate.
16. The composition of matter of claim 2, wherein R' is aryl.
17. The composition of matter of claim 16, wherein R' is phenyl.
18. The composition of matter of claim 1, wherein $n$ is 2.
19. As the composition of matter of claim 18 di[1-(O,O-di-butylphosphorodithiato)]ethyl succinate.
20. A method of preparing the phosphorodithioic alkyl carboxylate of claim 1 comprising reacting an O,O-diorganophosphorodithioic acid with a vinyl carboxylate at a temperature of from 40° to about 150° C.
21. The method of claim 20 wherein the vinyl carboxylate is vinyl acetate.
22. The method of claim 20 wherein the vinyl carboxylate is vinyl benzoate.

References Cited

UNITED STATES PATENTS

| 2,565,920 | 8/1951 | Hook et al. | 260—978 X |
| 2,865,804 | 12/1958 | Bavley et al. | 260—978 X |
| 3,168,436 | 2/1965 | Chupp | 260—952 X |

JOSEPH REBOLD, Primary Examiner

A. H. SUTTO, Assistant Examiner

U.S. Cl. X.R.

252—46.6, 389, 400; 260—347.2, 403, 930, 952, 978, 981

PO-1050
(5/69)

UNITED STATES PATENT OFFICE
CERTIFICATE OF CORRECTION

Patent No. 3,646,172          Dated February 29, 1972

Inventor(s) HERBERT MYERS

It is certified that error appears in the above-identified patent and that said Letters Patent are hereby corrected as shown below:

In column 2, line 37, "bout" should be -- about --. In column 3, line 21, "carboxylic" should be -- carboxylate --. In column 3, line 46, "benzy" should be -- benzyl --. In column 3, line 54, "O,O'-diarylphosphorodithioic" should be -- O,O-diarylphosphorodithioic --. In column 4, line 63, "refluixing" should be -- refluxing --. In column 9, line 43, "$(RO)_2P(S)SCHOC(O)R'$" should be -- $(RO)_2P(S)SCHOC(O)R'$ --.
                           $\overline{R}''$                                       $R''$ Signed and sealed this 5th day of September 1972.

(SEAL)
Attest:

EDWARD M. FLETCHER, JR.          ROBERT GOTTSCHALK
Attesting Officer                    Commissioner of Patents